United States Patent
Cavanaugh

(10) Patent No.: US 8,305,033 B2
(45) Date of Patent: Nov. 6, 2012

(54) PROXIMITY DETECTION CIRCUIT FOR ON-BOARD VEHICLE CHARGER

(75) Inventor: William Cavanaugh, Rockford, IL (US)

(73) Assignee: Lear Corporation, Southfield, MI (US)

( * ) Notice: Subject to any disclaimer, the term of this patent is extended or adjusted under 35 U.S.C. 154(b) by 310 days.

(21) Appl. No.: 12/850,835

(22) Filed: Aug. 5, 2010

(65) Prior Publication Data
US 2012/0032634 A1    Feb. 9, 2012

(51) Int. Cl.
*H01M 10/46* (2006.01)
(52) U.S. Cl. ........................................................ 320/104
(58) Field of Classification Search ................ 320/104, 320/107, 128, DIG. 34; 361/1
See application file for complete search history.

(56) References Cited

U.S. PATENT DOCUMENTS

| | | | |
|---|---|---|---|
| 5,563,496 A * | 10/1996 | McClure | ...................... 320/128 |
| 6,905,362 B2 | 6/2005 | Williams | |
| 6,963,186 B2 | 11/2005 | Hobbs | |
| 7,253,584 B2 | 8/2007 | Souther et al. | |
| 7,411,371 B2 | 8/2008 | Hobbs | |
| 8,212,527 B2 * | 7/2012 | Zhang et al. | ................... 320/132 |
| 2010/0219797 A1 * | 9/2010 | Veselic et al. | ................. 320/162 |

FOREIGN PATENT DOCUMENTS

| | | |
|---|---|---|
| DE | 19503310 A1 | 8/1996 |
| DE | 19715880 C1 | 7/1998 |

OTHER PUBLICATIONS

Mennekes Elektrotechnik GmbH & Co. KG, "Ladesysteme fur Elektrofahrzeuge", Volker Lazzaro, Rev. 10, Feb. 18, 2009, 44 pages.
German Office Action for corresponding Application No. 10 2011 079 361.5, mailed May 2, 2012, 8 pages.

* cited by examiner

*Primary Examiner* — Edward Tso
(74) *Attorney, Agent, or Firm* — Brooks Kushman P.C.

(57) ABSTRACT

A proximity detection circuit suitable for use with an on-board vehicle charger, such as but not limited to the type of charges used within hybrid and hybrid electric vehicles, to facilitate current conservation during period of time when it is unnecessary or otherwise undesirable for the on-board charger to test for connection of a cordset or other connection used to connect the on-board charger to a charging station or other current source.

20 Claims, 2 Drawing Sheets

PROXIMITY DETECTION CIRCUIT FOR ON-BOARD VEHICLE CHARGER

TECHNICAL FIELD

The present invention relates to proximity detection circuits of the type suitable for use with on-board vehicle chargers to detect connection to a cordset or other element used to facilitate vehicle charging.

BACKGROUND

An on-board vehicle charger may be used to charge a high voltage battery found in a hybrid electric or electric vehicle to provide energy to an electrically powered motor. In some cases, the charging may be facilitated with a cordset or other element having capabilities to facilitate current delivery to the on-board charger, such as from a wall charger or other type of charging station. The cordset may be include an adaptor to facilitate attachment to an outlet or other receptacle associated with the on-board charger. The on-board charger may include electronics or other elements to control and manage current flow to the high voltage battery and other the related charging operations.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

Figure 1:
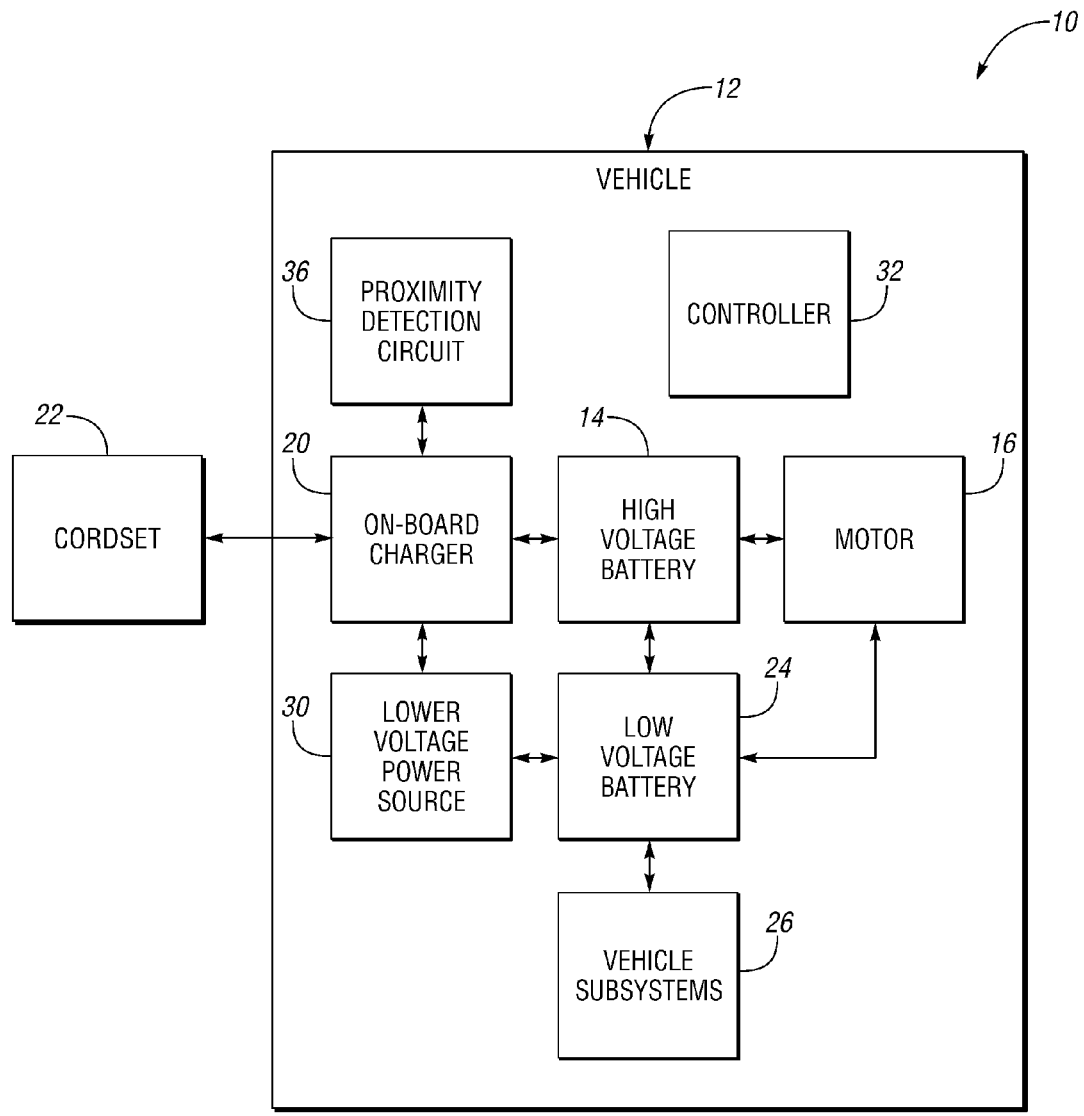
FIG. 1 functionally illustrates a vehicle power system in accordance with one non-limiting aspect of the present invention.

FIG. 1 functionally illustrates logical elements associated with a vehicle power system 10 in accordance with one non-limiting aspect of the present invention. The vehicle power system 10 is shown and predominately described for use within an electric vehicle, hybrid electric vehicle, or other vehicle 12 having a high voltage battery 14 or other energy source operable to provide current sufficient for use by an electric motor 16 to drive the vehicle 12. The vehicle 12 may include an on-board charger 20 to facilitate charging the high voltage battery 14 with current delivered through a cordset 22 used to connect the on-board charger to a wall charger or other charging station (not shown). The cordset 22 may used to deliver current through a cable having a terminal (not shown) at one end adapted for receipt within a receptacle or outlet (not shown) associated with the on-board charger 20.

The on-board charger 20 may include electronics or other elements operable to control and manage current flow used to support charging related operations for the high voltage battery 14, and optionally, to support charging or otherwise powering a low voltage battery 24, one or more vehicle subsystem 26, and/or other electronically operable elements included within the vehicle 12. The low voltage battery 24 may be included to support powering vehicle systems 26 that operable at voltages lower than the electric motor 16, such as but not limited to remote keyless entry systems, heating and cooling systems, infortainment systems, braking systems, etc. In addition to being charged with energy provided through the cordset 22, one or more of the high and low voltage batteries 14, 24 and vehicle subsystems 26 be operable to power each other and/or to be powered with energy generated by the electric motor 16.

The low voltage battery 24, for example, may be operable to provide current sufficient for use by a lower voltage power source 30. The lower voltage power source 30 may be operable to regulate current from the low voltage battery 24 for use with one or more of the vehicle subsystems 26 and/or the on-board charger 20. A controller 32 may be included to facilitate executing logical operations and undertaking other processing requirements associated with the vehicle 12 (optionally, one or more of the elements may included their own controller or processor). For exemplary purposes, the terms "lower", "low" and "high" are used to differentiate voltage levels respectively coinciding with approximately 5 VDC, 12 VDC, and 200 VDC, which are commonly used within vehicles to support the operation associated with each of the corresponding energy sources. This is done without intending to unnecessarily limit the scope and contemplation of the present invention as the present invention fully contemplates the energy sources having the same or different voltage levels and/or current production/generation capabilities.

One non-limiting aspect of the present invention contemplates the lower voltage power source 30 being operable to set a voltage used by the on-board charger 20 to test for connection of the cordset 22. The lower voltage source 30, for example, may be a voltage or current regulator having capabilities sufficient to compensate for voltage variation of the low and/or high voltage battery 14, 24 in order to provide steady current to the on-board charger 20 and/or other element electrically connected thereto, which may be sensitive to voltage variations. The lower voltage power source 30 may be operable to a sleep state when not in use so as to prevent consumption of current from the low voltage battery 24 and to an active state when desired to provide current and regulate voltage from the low voltage battery 24.

One non-limiting aspect of the present contemplates conserving the amount of current consumed while use of the on-board charger 20 is unnecessary (e.g., while the vehicle is off, the cordset is disconnected, etc.). The current conservation contemplated by one non-limiting aspect of the present invention may be achieved by transitioning the lower voltage power source 24 to the sleep state when operation of the on-board charger 20 is unnecessary, and thereafter transiting the lower voltage source 24 from the sleep state to the active state when use of the on-board charge 20 is desired.

A proximity detection circuit 36 may be included in accordance with one non-limiting aspect of the present invention to facilitate a current conservative configuration operable to facilitate registering connection of the cordset 22 to the on-board charger 20 while the lower voltage power source 30 is in the sleep or inactive state. The proximity detection circuit 36 may be operable to transitions the lower voltage power source 30 from the sleep state to the active state while consuming less than 50-100 uA. Once the lower voltage power source 30 is activated by the proximity detection circuit 36, the electronics of the on-board charger 20 may then be used to detect a proper connection of the cordset.

Figures 2, 3:
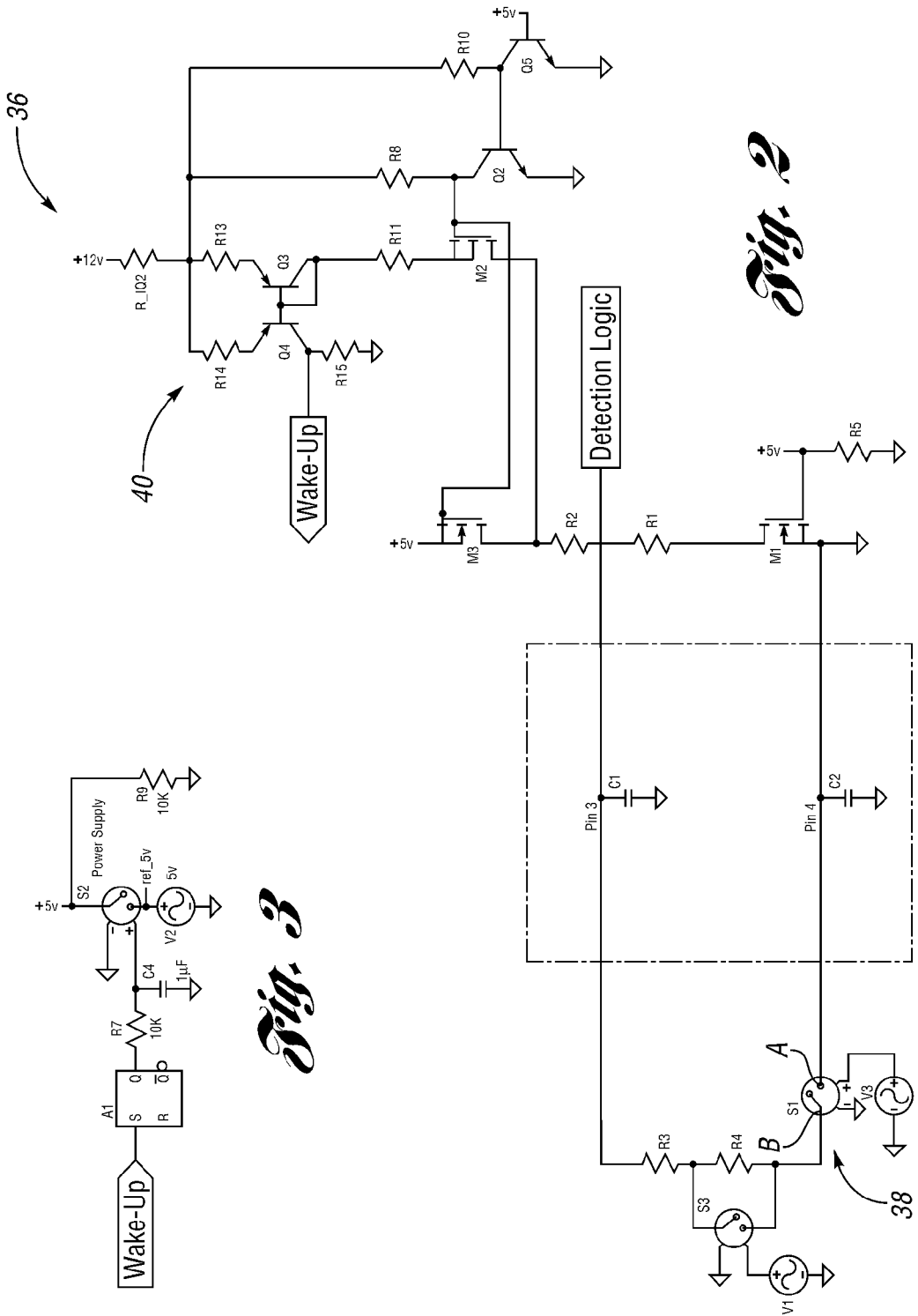
FIG. 2 illustrates a proximity detection circuit in accordance with one non-limiting aspect of the present invention.
FIG. 3 illustrates a lower voltage power supply circuit in accordance with one non-limiting aspect of the present invention.

FIG. 2 schematically illustrates the proximity detection circuit 36 in accordance with one non-limiting aspect of the present invention. The proximity detection circuit 36 is intended to encompass the circuit related elements (switches, resistors, capacitors, diodes, etc.) shown in FIG. 2 and is not intended to necessarily require those circuit elements to be part of a dedicated circuit. Rather, the circuit elements may be part of any one or more of the logical elements shown in FIG. 1, i.e., some or all of the illustrated circuit components may be included in some or all of the on-board charger 20, the lower voltage power source 30, the vehicle subsystems 26, the controller 32, the motor 16, etc. While multiple circuit elements are shown to achieve certain results, the present invention fully contemplates the use of other circuit elements to achieve similar results, particularly the use of other current conservative elements.

When the cordset 22 is connected to the on-board charger 20, the circuit 36 is configured such that the cordset 22 forms part of the proximity detection circuit 36 as represented with switch S1, e.g., in the case of the cordset 22 having a three-pronged connection, an electrical connection between nodes A and B of the switch S1 may be established through the positive and negative terminals (the ground terminal may be grounded to the vehicle chassis.) In this manner, the cordset 22 may be considered to form part of the proximity circuit 36 when inserted within the outlet used to connect it to the on-board charger 22.

In some cases, a lock or other actuator (not shown) may be included to secure the cordset 22 within the outlet or to otherwise facilitate user actuation of a device intended to reflect connection of the cordset. A switch S3 may be actuated from a normally open position to the closed positioned when the actuator is closed. As described below in more detail, resistors R3 and R4 may be included to induce certain voltages depending on whether the switch S3 is closed (i.e., actuator closed) to short resistor R4. The elements associated with the cordset connection to the outlet and the actuator may be identified as a connection circuit portion 38 of the proximity circuit.

Once the cordset is connected, a voltage is provided between pin 3 and pin 4 in proportion to a voltage provided through the cordset 22. The on-board charger 20 may include connectors or other features that manipulate or otherwise manage the voltage between the pin 3 and the pin 4 in order to facilitate charging the high voltage battery 14. While not shown, the on-board charger 20 may include any number of these types of circuit elements to facilitate the charging of the high voltage battery 14. In addition to the circuit elements used to facilitate transferring charge from the cordset 22 to the high voltage battery 14, additional circuit elements and electronics (not shown) may be included to detect connection of the cordset 22.

The determination of whether the cordset 22 is properly connected may be made by the corresponding on-board charger electronics measuring a voltage across resistor R1, which is shown to be represented with a detection logic identifier. The lower voltage power source 30 may be configured to provide a 5V reference voltage, which is shown to be commonly used throughout the proximity circuit, such that the voltage across the resistor R1 may register a first voltage set by a resistor R2 and mosFETs M1 and M3 when the cordset 22 is disconnected and a second, greater voltage set by the cordset 22, resistor r1 and mosFET M1 where the cordset 22 is connected. The on-board charger 20 may determine the cordset 22 to be properly connected based on whether the first or second voltage is detected.

One non-limiting aspect of the present invention contemplates conserving current consumption of the lower voltage power source 30 and the on-board charger 20 by maintaining the lower power source 30 in the sleep state whenever possible. While in the lower voltage source 30 is in the sleep state, depending on the configuration of the on-board charger 20, the on-board charger 20 may be unable to detect connection of the cordset 22 since the on-board charger 20 relies on the 5V provided by the lower voltage source 30 to facilitate testing of the first and second voltages noted above (e.g., enabling operation of mosFET ml). FIG. 3 illustrates a circuit for the lower voltage power supply in accordance with one non-limiting aspect of the present invention where a wake-up voltage is provided to an integrated circuit associated with the operation of the lower voltage power source.

The proximity detection circuit 36 may include a wake-up circuit 40 operable to facilitate transitioning the lower voltage power source between the sleep state and active state in response to receipt of wake-up voltage set by resistor R1. The wake-up voltage may be generated immediately upon connection of the cordset (closing of switch S1) during which the wake-up circuit transitions from an open circuit state to a closed circuit state with the closing of a current path between a 12V input from the low voltage battery, switch Q3, resistor R11, mosFET M2, resistor R2, resist R3, and resistor R4.

The wake-up voltage becomes available as soon as the activation of switch Q3 actives switch Q4 to create a voltage divider between resistors R14 and R15, which in turn sets the wake-up voltage. As soon as the wake-up voltage is received by the lower voltage power source, it transitions from the sleep state to the active state and begins generating the 5V provided to mosFETs M1, M3, and M5. This supply of power in turn activates switch Q5, which then deactivates switch Q2 and mosFET M2. The deactivation of mosFET M2 activates mosFET M3 to establish the voltage drop across the resistor R1 used to detect connection of the cordset 22 by the on-board vehicle charger 20 electronics. Thereafter, the lower power source 30 remains in active mode until the cordset 22 is removed and the corresponding voltage change is registered across the resistor R1, at which point the lower voltage source 30 is transitioned to sleep mode with signals (not shown) from the on-board charger 20, controller 32 or other suitable element.

As supported above, the present invention is able to conserve current consumption of a lower voltage power source used to provide a test voltage that operates with electronics of an on-board charger or other testing element to detect a voltage value associated with a connection status of a cordset or other element used to electrically connected an on-board vehicle charger to a charging station or other element remote from the vehicle. The related circuit may utilize a Bi-polar current mirror in series with a wiring configuration specified for charge coupler to wake-up an on-board charger for a plug-in hybrid vehicle or electric vehicle. The circuit may have a low-quiescent current draw off of battery and use the actual charge coupler connector to complete the circuit used to wake-up the power supply of the on-board charger. The circuit then re-arranges itself after power supply wake-up to become the actual proximity detection circuit. The circuit may be constructed entirely out of hardware components such that the wake-up voltage can be generated without using a processor having to issue instructions or generate signals according to stored code. (In the event a processor is required to transitioning the lower voltage source to sleep mode, the present invention is able to awaken the sleeping lower voltage processor without requiring processor operations.)

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle power system having a high voltage battery being operable to output current sufficient to power an electric motor operable to drive the vehicle; a low voltage battery being operable to output current sufficient to power one or more vehicle subsystems, the low voltage battery being unable to output current sufficient to power the electric motor; a low voltage power supply being operable to regulate current provided from the low voltage battery when in an active state and inoperable to regulate current provided from the low voltage battery when in a sleep state, the vehicle power system comprising;
    a on-board vehicle charger being operable to charge the high voltage battery with current provided through a cordset connected thereto, the on-board charger requiring regulated current from the low voltage power supply in order to detect connection of the cordset;
    a proximity detection circuit being operable to transition the low voltage power supply from the sleep state to the active state upon connection of the cordset to the on-board vehicle charger.

2. The vehicle power system of claim 1 wherein the proximity detection circuit is further operable to determine the connection of the cordset without drawing a quiescent current greater 100 uA.

3. The vehicle power system of claim 1 wherein the proximity detection circuit includes a wake-up circuit operable to generate a wake-up voltage using current provided from the low voltage battery, the wake-up voltage being sufficient to transition the low voltage power supply from the sleep state to the active state.

4. The vehicle power system of claim 3 wherein the cordset forms a portion of the wake-up circuit when connected to an outlet of the on-board charger.

5. The vehicle power system of claim 4 wherein the wake-up circuit is further operable to transition from an open circuit state to a closed circuit state when the cordset connects to the outlet, the wake-up circuit being operable to generate the wake-up voltage when in the closed circuit state and inoperable to generate the wake-up voltage when the open circuit state.

6. The vehicle power system of claim 5 wherein the wake-up circuit is further operable to cease to draw current used to generate the wake-up voltage once the low voltage power supply is transitioned from the sleep state to the active state.

7. The vehicle system of claim 1 wherein the proximity detection circuit includes a connection circuit being operable to detect connection of the cordset when a voltage drop across a resistor connected to the low voltage power supply is greater than a voltage threshold.

8. The vehicle system of claim 7 wherein the connection circuit is operable to detect a closing of an actuator used to lock the cordset to the on-board vehicle charger as a function of the voltage drop across the resistor.

9. A proximity detection circuit for use within a power supply requiring transitioning from a sleep state to an active state in order to supply voltage required by an on-board charger to test for a connection of a cordset, the proximity detection circuit comprising:
    a connection circuit formed in part by the cordset when connected to the on-board charger; and
    a wake-up circuit being operable to generate a wake-up voltage sufficient to transition the power supply from the sleep state to the active state upon the cordset being connected to the on-board charger.

10. The proximity detection circuit of claim 9 wherein the wake-up circuit is further operable to generate the wake-up voltage without consuming more than 100 uA of current while the cordset is disconnected from the on-board charger.

11. The proximity detection circuit of claim 9 wherein the wake-up circuit is further operable to generate the wake-up voltage without relying on a processor to facilitate transitioning the power source from the sleep state to the active state.

12. The proximity detection circuit of claim 9 wherein the wake-up circuit is further operable to generate the wake-up voltage with the cordset closing and forming part of a current path used to connect a resistor that is positioned in series with a low voltage vehicle battery.

13. The proximity detection circuit of claim 9 further comprising a first resistor being connected in series with the power supply and the cordset, wherein the on-board charger utilizes a measurement node to test for the connection of the cordset based on a voltage drop across the first resistor.

14. The proximity detection circuit of claim 13 further comprising an actuator circuit operable to place a second resistor in series with the first resistor and the cordset upon an actuator switch being in an open state and to bypass the second resistor when the actuator switch is closed.

15. The proximity detection circuit of claim 14 further comprising a first switch being connected in series with the first resistor, the cordset, and the second resistor (R4), wherein the first switch is operable to prevent current flow through the first resistor when the power source is in the sleep state.

16. A method for activating an inactive power supply used to supply a test voltage required by an on-board charger to test for connection of a cordset, the method comprising:
    detecting a connection of the cordset; and
    activating the inactive power source to an active state after detecting connection of the power source and before providing the test voltage.

17. The method of claim 16 wherein activating the inactive power source further comprises activating the inactive power source with a wake-up voltage provided from a wake-up circuit.

18. The method of claim 17 wherein detecting the connection of the cord set further comprises detecting the connection of the cordset without the wake-up circuit consuming more than 100 uA of current while the cordset is disconnected.

19. The method of claim 16 wherein activating the inactive power supply further comprises activating the inactive power supply without the inactive power supply consuming current other than when the power supply is in the active state.

20. The method of claim 16 wherein activating the inactive power source further comprises activating the inactive power supply without issuing instructions from a processor and without relying on a clock signal.

* * * * *

UNITED STATES PATENT AND TRADEMARK OFFICE
CERTIFICATE OF CORRECTION

PATENT NO. : 8,305,033 B2
APPLICATION NO. : 12/850835
DATED : November 6, 2012
INVENTOR(S) : William Cavanaugh Page 1 of 1

It is certified that error appears in the above-identified patent and that said Letters Patent is hereby corrected as shown below:

IN THE CLAIMS

Column 5, Line 28, Claim 1:

Delete "a on-board" and
Insert -- an onboard --

Column 5, Line 54, Claim 5:

After "wake-up voltage when"
Insert -- in --

Signed and Sealed this
Sixteenth Day of April, 2013

Teresa Stanek Rea
*Acting Director of the United States Patent and Trademark Office*